(12) United States Patent
Farquharson et al.

(10) Patent No.: US 11,879,582 B2
(45) Date of Patent: Jan. 23, 2024

(54) METHOD AND SYSTEM FOR FLUIDLY CONNECTING FRACTURING MANIFOLD AND FRACTURING TREE

(71) Applicant: Stream-Flo Industries Ltd., Edmonton (CA)

(72) Inventors: Keith David Farquharson, Edmonton (CA); Kevin Andrew Elgert, Sylvan Lake (CA)

(73) Assignee: Stream-Flo Industries Ltd., Edmonton (CA)

( * ) Notice: Subject to any disclaimer, the term of this patent is extended or adjusted under 35 U.S.C. 154(b) by 521 days.

(21) Appl. No.: 17/096,309

(22) Filed: Nov. 12, 2020

(65) Prior Publication Data

US 2021/0148500 A1 May 20, 2021

Related U.S. Application Data (60) Provisional application No. 62/935,512, filed on Nov. 14, 2019.

(51) Int. Cl.
*E21B 43/26* (2006.01)
*F16L 39/02* (2006.01)
*F16L 39/06* (2006.01)

(52) U.S. Cl.
CPC .......... *F16L 39/02* (2013.01); *E21B 43/2607* (2020.05); *F16L 39/06* (2013.01)

(58) Field of Classification Search
CPC .............................. E21B 43/26; E21B 43/2607
See application file for complete search history.

(56) References Cited

U.S. PATENT DOCUMENTS

| | | | |
|---|---|---|---|
| 1,329,760 | A | 2/1920 | Fulton |
| 2,934,095 | A | 4/1960 | Lockart |
| 8,469,108 | B2 | 6/2013 | Kajaria et al. |
| 8,474,521 | B2 | 7/2013 | Kajaria et al. |
| 8,656,990 | B2 | 2/2014 | Kajaria et al. |
| 8,813,836 | B2 | 8/2014 | Kajaria et al. |
| 8,839,867 | B2 | 9/2014 | Conrad |

(Continued)

OTHER PUBLICATIONS

U.S. Appl. No. 16/102,507, filed Aug. 13, 2018.

(Continued)

*Primary Examiner* — Matthew R Buck
(74) *Attorney, Agent, or Firm* — Leydig, Voit & Mayer, Ltd.

(57) ABSTRACT

A method and fluid connection system to fluidly connect a fracturing manifold to a fracturing tree. The method includes fluidly connecting a plurality of flexible flowlines between the manifold outlet of a fracturing manifold module and the fracturing tree such that fluid from the manifold outlet is distributed into the flexible flowlines and into the fracturing tree to avoid abrupt or right angle changes in direction in all fluid connections at the fracturing tree and between the manifold outlet and the fracturing tree. The fluid connection system includes a flow distribution block having a single inlet and a plurality of outlets, and distributes fluid flow between the single inlet and the plurality of outlets without abrupt or right angle changes in direction. The flexible flowlines have a first end fluidly connected to one of the plurality of outlets, and a second end fluidly connected to the fracturing tree.

23 Claims, 5 Drawing Sheets

(56) References Cited

U.S. PATENT DOCUMENTS

| | | | |
|---|---|---|---|
| 8,899,268 B2 | 12/2014 | Garner et al. | |
| 8,978,763 B2 | 3/2015 | Guidry | |
| 9,004,104 B2 | 4/2015 | Ungchusri et al. | |
| 9,068,450 B2 | 6/2015 | Guidry | |
| 9,127,545 B2* | 9/2015 | Kajaria | F16L 23/08 |
| 9,175,556 B2 | 11/2015 | Cherewyk et al. | |
| 9,222,345 B2 | 12/2015 | Conrad | |
| 9,239,125 B2 | 1/2016 | Ungchusri et al. | |
| 9,255,469 B2 | 2/2016 | Conrad | |
| 9,416,637 B2 | 8/2016 | Allouche | |
| 9,518,430 B2 | 12/2016 | Guidry | |
| 9,534,604 B2 | 1/2017 | Lopez et al. | |
| 9,568,138 B2 | 2/2017 | Arizpe et al. | |
| 9,605,525 B2* | 3/2017 | Kajaria | E21B 43/2607 |
| 9,631,469 B2 | 4/2017 | Guidry et al. | |
| 9,759,054 B2 | 9/2017 | Gay et al. | |
| 9,903,190 B2 | 2/2018 | Conrad et al. | |
| 9,915,132 B2 | 3/2018 | Conrad | |
| 9,932,800 B2 | 4/2018 | Guidry | |
| 10,132,146 B2 | 11/2018 | Guidry | |
| 10,459,461 B2* | 10/2019 | Boyd | E21B 41/00 |
| 10,570,692 B1* | 2/2020 | Sizemore | E21B 43/26 |
| 2010/0300672 A1* | 12/2010 | Childress | E21B 43/2607 137/561 A |
| 2011/0030963 A1 | 2/2011 | Demong et al. | |
| 2015/0083426 A1 | 3/2015 | Lesko et al. | |
| 2016/0363242 A1 | 12/2016 | De Nora | |
| 2016/0376864 A1 | 12/2016 | Roesner et al. | |
| 2017/0159654 A1 | 6/2017 | Kendrick | |
| 2017/0198548 A1* | 7/2017 | Dickinson | E21B 43/26 |
| 2017/0268306 A1 | 9/2017 | Kajaria et al. | |
| 2017/0275980 A1 | 9/2017 | Kajaria | |
| 2017/0306987 A1 | 10/2017 | Theodossiou | |
| 2017/0314379 A1 | 11/2017 | Guidry | |
| 2017/0350223 A1 | 12/2017 | Guidry et al. | |
| 2017/0370172 A1 | 12/2017 | Tran et al. | |
| 2017/0370199 A1 | 12/2017 | Witkowski et al. | |
| 2018/0058171 A1 | 3/2018 | Roesner et al. | |
| 2018/0073308 A1 | 3/2018 | Tran et al. | |
| 2018/0187507 A1 | 7/2018 | Hill et al. | |
| 2018/0187508 A1* | 7/2018 | Roesner | E21B 33/068 |
| 2018/0187537 A1 | 7/2018 | Hill et al. | |
| 2018/0347286 A1 | 12/2018 | Scott et al. | |
| 2019/0203862 A1* | 7/2019 | Ungchusri | F17D 1/08 |
| 2020/0048980 A1 | 2/2020 | Jesperson et al. | |
| 2020/0088021 A1 | 3/2020 | Guidry | |
| 2020/0103078 A1 | 4/2020 | Scott et al. | |
| 2021/0010358 A1 | 1/2021 | Guidry | |

OTHER PUBLICATIONS

Cameron, *Frac manifold systems*, [Brochure]. Retrieved from https://www.slb.com/fracmanifolds (copyright 2016, Schlumberger).

Cameron, Monoflex Dual-connection fracturing fluid delivery technology (Brochure). Retrieved from https://www.slb.com/monoflex (Copyright 2018, Schlumberger).

E&P, Roesner, T., et al. Solving Inefficiencies of Fracturing Fluid Delivery, [Brochure]. Retrieved Dec. 19, 2017 from https://www.epmag.com/solving-inefficiencies-fracturing-fluid-delivery-825386.

Performance Wellhead & Frac Components, Frac Manifold Solutions, "[Brochure]." Retrieved from https://www.pwfrac.com/products/frac-manifold-solutions (n.d.).

Weir Oil & Gas, Seaboard™ Zip Pac Manifold Systems, "[Brochure]." Retrieved from https://www.global.weir.com (copyright 2014, Seaboard).

* cited by examiner

METHOD AND SYSTEM FOR FLUIDLY CONNECTING FRACTURING MANIFOLD AND FRACTURING TREE

CROSS REFERENCE TO RELATED APPLICATIONS

This application claims priority from U.S. Provisional Patent Application No. 62/935,512 filed Nov. 14, 2019, which is incorporated by reference herein to the extent that there is no inconsistency with the present disclosure.

FIELD OF THE INVENTION

This disclosure relates to hydrocarbon well stimulation equipment and methods for downhole hydraulic fracturing, and more particularly, to equipment, systems and methods used in multi-pad drilling and fracturing operations in order to fluidly connect a fracturing manifold to a fracturing tree.

BACKGROUND OF THE INVENTION

Current methods for completing hydrocarbon wells often require initial high pressure fracturing fluids to be introduced to hydraulically fracture the formation, increasing permeability and allowing the flow of hydrocarbons during production. The stimulation services provide the high pressure fracturing fluid, which is transported through the fracturing manifold system to fracturing trees rated for the high-pressure stimulation on the wellheads. On multi-pad well sites, the fracturing manifold system controls the flow of the fracturing fluid to the corresponding well being stimulated and isolates flow to the other wells.

This process of hydraulic fracturing ("fracing") creates fractures in rocks, to increase the output of a well. The fracture is formed by pumping a fracturing fluid into the wellbore at a rate sufficient to increase the pressure downhole to a value exceeding the fracture gradient of the formation rock. The fracture fluid can be any number of fluids, with chemical additives, ranging from water to gels, foam, nitrogen, carbon dioxide, acid or air in some cases. The pressure causes the formation to crack, allowing the fracturing fluid to enter and extend the crack further into the formation. To maintain the fractures open, propping agents are introduced into the fracturing fluid and pumped into the fractures to extend the breaks and pack them with proppants, or small particles generally composed of quartz, ceramic, or aluminum oxide. The propped hydraulic fracture provides a high permeability conduit through which the hydrocarbon formation fluids can flow to the well.

At the surface, hydraulic fracturing equipment for oil and natural gas fields usually includes frac tanks holding fracturing fluids and proppants which are coupled through supply lines to a slurry blender, one or more high-pressure fracturing pumps to pump the fracturing fluid to the frac head of the well, and a monitoring unit. Fracturing equipment operates over a range of high pressures and injection rates. Many frac pumps are typically used at any given time to maintain the very high, and required, pressures and flow rates into the frac head and into the well.

The high pressure fracturing fluid flows to the inlet of shared fracturing manifold trunk lines (also known as zipper manifolds), through a single large diameter high-pressure line or multiple smaller diameter high-pressure lines. The inlet block of the shared fracturing manifold trunk line is fluidly connected to one of the fracturing manifold modules (also known as manifold leg or zipper module), or between two fracturing manifold modules, and additional fracturing manifold modules are connected together with a single shared manifold trunk line. The shared fracturing manifold trunk line may include joints, which may or may not be adjustable. Each fracturing manifold module typically corresponds to a single well for stimulation. The flow control unit components of the fracturing manifold module typically include a manifold inlet (for example an inlet tee, cross, or block) to align and connect to the shared manifold trunk line, one or more control valves (typically two, for example gate valves or plug valves) and a manifold outlet (for example the outlet from the control valve, an outlet tee, a cross, or a block) to align to the well. The manifold outlet fluidly connects to the fracturing tree on the wellhead through one or more high-pressure conduit lines or multiple high-pressure lines that may include connection blocks, pipe sections, right angle elbows and possibly pivot or swivel joints.

The fracturing manifold modules may be pre-assembled prior to transporting to the well pad and may be skid mounted. The skid may include one or multiple fracturing manifold modules, wherein each module includes the flow control unit components of an inlet, one or more control valves and an outlet. Each of these manifold modules is attached together at the inlet with the shared manifold trunk line, commonly with flanged connections and metal sealing gaskets. When making up this flanged connection, the flange faces must be aligned, that is parallel and coaxial with the axis of the shared manifold trunk line for integrity of the metal seal.

Due to the high-pressure rating required for the fracturing manifold equipment, each manifold module and skid commonly exceeds 20,000 lbs. A high capacity crane at the well pad is typically used to support and align each manifold module and skid when making up this connection to the shared fracturing manifold trunk line. Supporting the skid by crane, while aligning the connection at the inlet, is tedious, time consuming, and costly. As well, the crane supported skid connection to the shared manifold trunk line creates additional risks for workers.

Once the fracturing manifold modules are axially aligned along the shared fracturing manifold trunk line, the connections between the outlet and the fracturing tree are made up, using one or more high-pressure conduit lines that may include connection blocks, pipe sections, right angle elbows and possibly pivot or swivel joints to accommodate the distance and changes in height between the outlet and the connection to the fracturing tree. This connection of each of the fracturing manifold modules to the fracturing tree is tedious, time consuming and costly.

As above-mentioned, the fracturing fluids are pumped and delivered to the fracturing tree at high pressures. Erosion of the connections, manifold components and conduits is problematic. As well, erosion of the components in the fracturing tree, and of the wellhead components located below the fracturing tree, for example the master valves and the tubing head etc., is also problematic.

SUMMARY OF THE INVENTION

In some embodiments, a method is provided for fluidly connecting a fracturing manifold to a fracturing tree, wherein the fracturing manifold includes a shared manifold trunk line and a fracturing manifold module having a manifold inlet, a manifold outlet, one or more flow control valves between the manifold inlet and the manifold outlet, and the manifold inlet being adapted for connection to the shared manifold trunk line. Broadly stated, the method includes fluidly connecting a plurality of flexible flowlines between the manifold outlet and the fracturing tree such that fluid from the manifold outlet is distributed into the plurality of flexible flowlines and into the fracturing tree in a manner to avoid abrupt or right angle changes in direction in all fluid connections at the fracturing tree and between the manifold outlet and the fracturing tree.

In some embodiments, the plurality of flexible flowlines is fluidly connected to avoid abrupt or right angle changes in direction in all fluid connections at the manifold outlet, at the fracturing tree and therebetween.

In some embodiments, each one of the plurality of flexible flowlines has a first end, a second end and a flexible conduit between the first end and the second end. In such embodiments, the method further includes:
  a) providing a flow distribution block having a single inlet and a plurality of outlets, and being adapted to distribute fluid flow therein between the single inlet and the plurality of outlets without abrupt or right angle changes in direction;
  b) fluidly connecting the single inlet of the flow distribution block to the manifold outlet;
  c) fluidly connecting the first end of each one of the plurality of flexible flowlines to one of the plurality of outlets of the flow distribution block; and
  d) fluidly connecting the second end of each one of the plurality of flexible flowlines to the fracturing tree in a manner to avoid abrupt or right angle changes in direction.

In some embodiments, in step d) of the above-described method, the fluid connections of the plurality of flexible flowlines to the fracturing tree are evenly spaced apart such that fluid flow entering the fracturing tree from each one of the plurality of flexible flowlines impinges on the fluid flow from other of the plurality of flexible flowlines for balanced impingement.

In some embodiments, step b) of the above-described method includes providing a manifold flowline having a first end and a second end; connecting the first end of the manifold flowline to the manifold outlet; and connecting the second end of the manifold flowline to the single inlet of the flow distribution block. In such embodiments, the manifold flowline is a rigid flowline.

In some embodiments, steps b), c) and d) of the above-described method are conducted in any order.

In some embodiments, the fracturing manifold module is of the type providing for an adjustable connection at the manifold inlet for aligned connection along an axis of the shared manifold trunk line, and steps b) to d) of the above-described method may be conducted before, during or after making the aligned connection at the manifold inlet to the shared manifold trunk line.

In some embodiments, the combined cross sectional area of the plurality of flexible flowlines is greater than the cross sectional area of the manifold outlet, or of the rigid flowline if present, to reduce flow velocity in the plurality of flexible flowlines and at entry to the fracturing tree relative to the flow velocity at the outlet, or in the rigid flowline if present.

In some embodiments, a fluid connection system is provided for fluidly connecting a fracturing manifold to a fracturing tree, wherein the fracturing manifold includes a shared manifold trunk line and a fracturing manifold module having a manifold inlet, a manifold outlet, one or more flow control valves between the manifold inlet and the manifold outlet, and the manifold inlet being adapted for connection to the shared manifold trunk line. Broadly stated, the fluid connection system includes:
  a flow distribution block having a single inlet and a plurality of outlets, and being adapted to distribute fluid flow therein between the single inlet and the plurality of outlets without abrupt or right angle changes in direction, the single inlet being adapted to provide a fluid connection to the manifold outlet; and
  a plurality of flexible flowlines, each of said flexible flowlines having a first end and a second end and a flexible conduit between the first end and the second end, the first end of each one of the plurality of flexible flowlines being adapted to fluidly connect to one of the plurality of outlets of the flow distribution block, and the second end of each one of the plurality of flexible flowlines being adapted to fluidly connect to the fracturing tree, such that all fluid connections at the fracturing tree and between the manifold outlet and the fracturing tree avoid abrupt or right angle changes in direction.

BRIEF DESCRIPTION ON THE DRAWINGS

Certain embodiments of the above features, aspects and advantages of the invention are described in greater detail with reference to the accompanying drawings in which like characters represent like parts throughout the drawings, in which.

DETAILED DESCRIPTION OF THE INVENTION

Fracturing System

Figure 1:
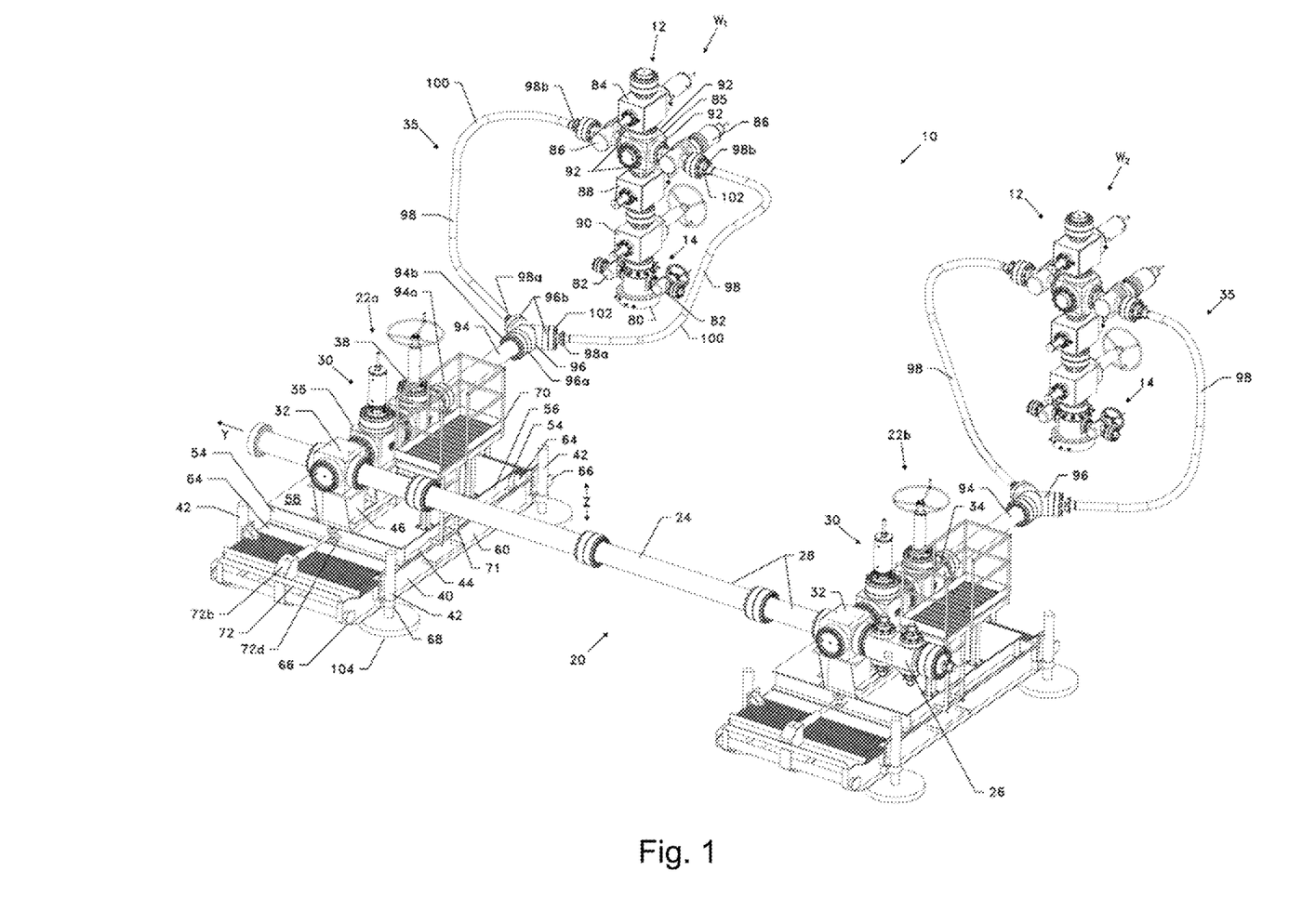
FIG. 1 is a perspective view illustrating a portion of a fracturing system in accordance with one embodiment of the present disclosure in which a plurality of fracturing manifold modules, here two, are axially aligned and connected via the manifold inlets to a shared fracturing manifold trunk line. The shared manifold trunk line receives high pressure fracturing fluid at manifold inlet block(s), as pumped from the stimulation services (not shown). The shared manifold trunk line is connected through the flow control unit components of each of the fracturing manifold modules and through a fluid connection system which includes a plurality of flexible flowlines, here two, at the manifold outlet to a fracturing tree of a well.

One embodiment of a fracturing system is shown generally at 10 in FIG. 1. A plurality of surface wells is generally provided on a multi-pad well site. In the FIG. 1, only two of the wells are shown, $W_1$-$W_2$, but it should be understood that two or more wells are generally fluidly connected at the multi-pad well site for fracturing. Each well is adapted for fracturing in a manner known in the industry. A high pressure fracturing fluid is received at each well, pumped from stimulation services (not shown, but as described above) through a fracturing manifold system 20 which includes a plurality of fracturing manifold modules 22 axially connected along a shared manifold trunk line 24.

FIG. 1 shows two identical fracturing manifold modules 22a, 22b connected to the shared manifold trunk line 24, although in other embodiments, the fracturing manifold modules may vary one from another, both in respect of the components included, and the connections to the fracturing manifold system 20. Exemplary embodiments of the shared manifold trunk line 24 and the fracturing manifold modules 22a, 22b are described more fully below. Since the modules 22a, 22b are shown in the Figures include similar components, the general description that follows simply refers to a manifold module 22, as it applies to both modules 22a, 22b of the Figures.

The fracturing system 10 also includes a sealed, high pressure fluid connection system 35 which provides a fluid connection from each of the fracturing manifold modules 22a or 22b to one of the fracturing trees 12 of the surface well $W_1$ or $W_2$. The fluid connection system 35 is described more fully below with reference to the multiple exemplary embodiments of FIGS. 1-5.

a) Shared Manifold Trunk Line

The shared manifold trunk line 24, as shown in the FIGS. 1-5, includes similar components, as described below for FIG. 1. In FIG. 1, the shared manifold trunk line 24 is shown to include an inlet block 26 located adjacent fracturing manifold module 22a, receiving the high pressure fracturing fluid from the stimulation services via fluid conduits (not shown), and a plurality of interconnected spacer spools 28 between other of the adjacent fracturing manifold modules 22a, 22b. In FIG. 1, the shared manifold trunk line 24 extends along an aligned, common center axis, which is herein referred to as the y-axis of the shared manifold trunk line 24. As noted above, the connections along the shared manifold trunk line 24 are commonly flanged connections with metal sealing gaskets, so the flange faces are sufficiently aligned, that is parallel one to another, and arranged coaxially with the axis of the shared manifold trunk line 24, in order to preserve the integrity of the metal seal. It will be understood that FIG. 1 shows one exemplary embodiment of a shared manifold trunk line 24. In other embodiments, the inlet block 26 may be connected at a different point along the shared manifold trunk line 24, and may be configured with more or fewer outlets to the shared manifold trunk line 24. The shared manifold trunk line 24 may include other components such as tee connections and valves. Similarly, the manifold trunk line 24 may include branch lines such as lines that are perpendicular to or parallel to other portions of the trunk line, and thus the fracturing manifold modules connected along these branch lines may be connected in a manner such that components of adjacent fracturing modules are located perpendicularly, parallel or opposed to each other.

b) Fracturing Manifold Modules

Each of the fracturing manifold modules 22a, 22b may include similar components or different components. In the FIGS. 1-5, the modules 22a, 22b each include identical components. In the following description, reference is generally made to FIGS. 1 and 5. The fracturing manifold modules 22a, 22b each includes a flow control unit 30 providing a manifold inlet 32, a manifold outlet 34 and one or more control valves between the inlet 32 and the outlet 34, such as a remotely operated gate valve 36 and a manually operated gate valve 38. The control valves might alternatively be plug valves or other industry standard control valves. In FIG. 1, the manifold inlet 32, outlet 34 and control valves 36, 38 are interconnected and axially aligned along an x-axis of the fracturing manifold module extending perpendicularly to the y-axis of the shared manifold trunk line 24.

Figure 5:
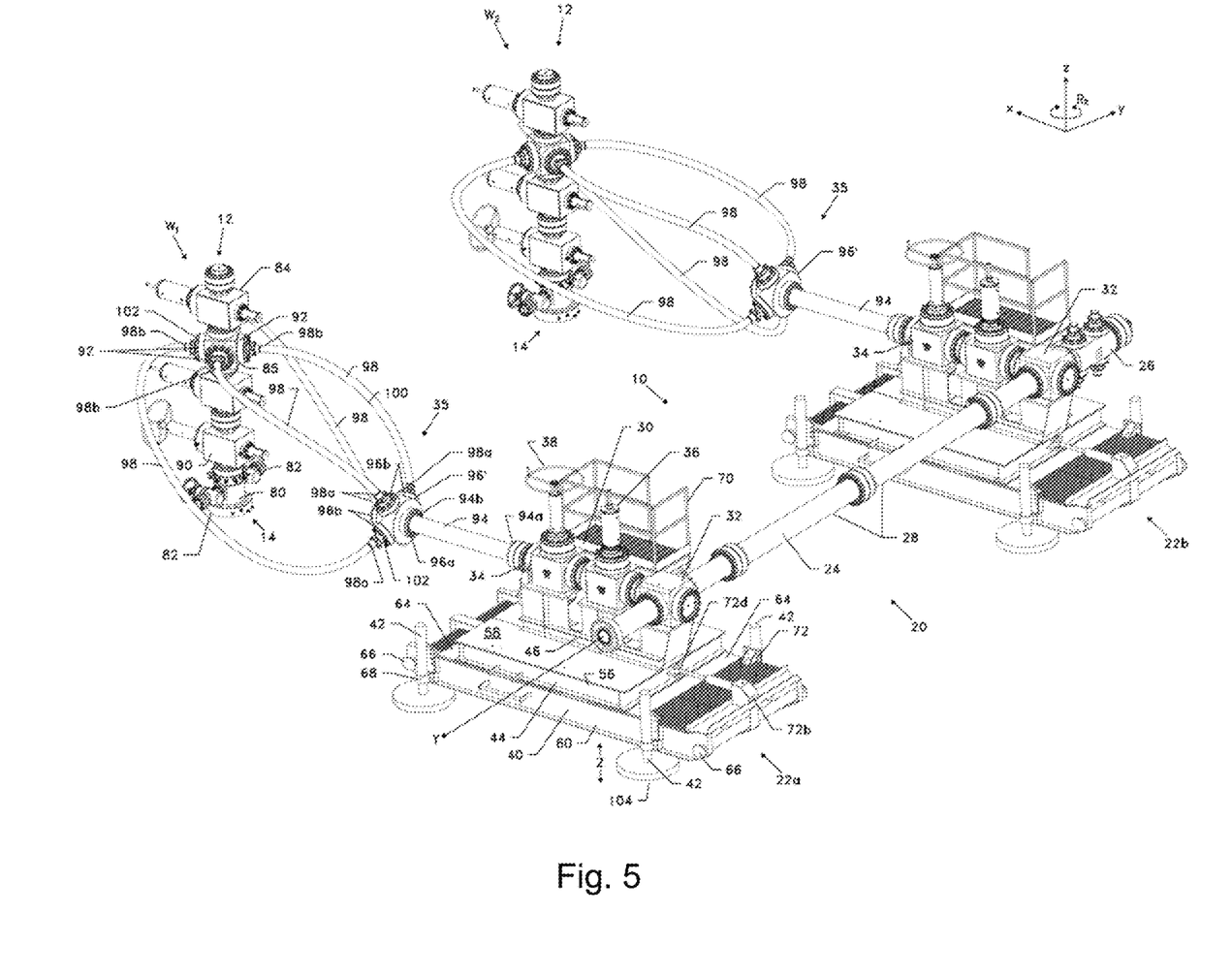
FIG. 5 is a perspective view of the fracturing system of FIG. 3, but taken from the left side of the fracturing system.

The x-axis is best seen in the x, y, z axis inset of FIG. 5. However, in other embodiments, the components of the flow control unit 30 may be interconnected and axially aligned along a z-axis (generally a vertical axis). The connections between the flow control unit components are shown as flange connections, although other industry standard connections may also be used. The inlet 32 is shown as a 4-way cross, and the outlet 34 is shown as the outlet from the control valve 38. However, in other embodiments, the manifold outlet may be a cross component, for example a 6-way cross. Other industry standard inlets and outlets may be used, with more or fewer connections at each of the inlets and outlets. The outlet 34 provides for connection from one of the fracturing manifold modules 22a, 22b to the fracturing tree 12 of one of the wells W, via the fluid connection system 35.

In some embodiments, each of the fracturing manifold modules 22a, 22b is of a type providing for an adjustable connection at the manifold inlet for aligned connection along the axis of the shared manifold trunk line. In some embodiments, this adjustable connection can be provided by mounting the modules on skids with height adjustment jacks, or by mounting the modules on rails, as is generally known in the art. In the Figures, this adjustable connection is as described in Applicant's U.S. patent application Ser. No. 16/102,507 filed Aug. 13, 2018, the details of which are incorporated herein by reference.

Each of the fracturing manifold modules 22a, 22b includes a transport skid 40 which supports the flow control unit 30. In some embodiments, more than one flow control unit may be supported on a single transport skid 40. For example, two or more parallel spaced flow control units may be provided on a single transport skid, with the inlets aligned along a common y-axis, or multiple flow control units may be provided on a single transport skid in which the inlet of the flow control units is shared, but each flow control unit provides a separate outlet.

The transport skid 40 is adapted to be ground supported, and may include one or more height adjustable legs 42 for leveling purposes. Alternatively, in some embodiments, the height adjustment may be provided by a support frame for the flow control unit 30. The transport skid 40 and the flow control unit 30 are connected together to provide for rotation of the flow control unit relative to the transport skid in a generally horizontal x-y plane relative to the ground. For ease of explanation herein, the x, y, z cartesian co-ordinates as applied to the fracturing manifold module 22 and the shared manifold trunk line 24 are shown as an inset in FIG. 5. A y-axis (Y) of the fracturing manifold module 22 extends through the inlet 32 so as to be aligned with the y-axis of the shared manifold trunk line 24. An x-axis of the fracturing manifold module 22 extends perpendicularly to the y-axis in an x-y plane. The x-y plane is a plane which is generally horizontal relative to the ground, and may be envisaged as a generally horizontal plane extending through the inlet 32 (for aligned connection at the inlet 32), a generally horizontal plane extending through the outlet 34 (for aligned connection at the outlet 34) or a generally horizontal plane extending through a support frame for the flow control unit such that the flow control unit components have fixed movement with the frame (such as flow control unit frame 44, for aligned connection at the inlet 32 and/or the outlet 34). The z-axis is generally perpendicular to the x-y plane, and generally refers to a vertical direction (i.e., generally parallel to the z-axis). The rotation of the flow control unit 30 relative to the transport skid is shown as Rz, and is about the z-axis perpendicular to the x-y plane. This rotation of the flow control unit 30 in the x-y plane relative to the transport skid provides for adjustable connection to the shared manifold trunk line 24 once the module 22 is landed with the inlet 32 positioned proximate to the connection to the shared manifold trunk line 24. In some embodiments, this rotation may provide for adjustable connection at the outlet 34 to the fracturing manifold system 10, for example via the fluid connection system 35 to one of the fracturing trees 12 of the plurality of wells W.

In the embodiments shown herein and described below, the transport skid 40 and the flow control unit 30 are also connected together to provide for translational movement of the flow control unit 30 relative to the transport skid 40 in the x-y plane. In FIG. 1, this relative translational movement is shown to be in the direction of both the y-axis and the x-axis of the fracturing manifold module 22 (i.e., separate translational movement in a direction generally parallel to the y-axis and in a direction generally parallel to the x-axis of the fracturing manifold module 22, with the y-axis being set to be parallel to the y-axis of the shared manifold trunk line 24). This relative translational movement provides for adjustable connection to the fracturing manifold system 20, for example to the shared manifold trunk line 24 at the inlet 32 and/or at the outlet 34 to the fracturing tree 12 of well W through the fluid connection system 35. In the description which follows, this adjustable connection is described at the inlet 32 and along an aligned y-axis of the shared manifold trunk line 24. However, it will be understood that the adjustable connection can be made at the inlet 32, along a different axis of the shared manifold trunk line 24 that is not co-axial through the inlet 32, such as along an axis perpendicular to the y-axis with the inlet connections for the shared manifold trunk line 24 being at right angles through the inlet 32. It will also be understood that the adjustable connection can be made at the outlet 34. As used herein and in the claims when describing a connection at the inlet along an axis of the shared manifold trunk line, the axis refers to the center axis of the particular inlet connection to that portion of the shared manifold trunk line.

The flow control unit 30 is shown to be pedestal mounted on a flow control unit frame 44 for fixed movement with the frame 44, that is, as the frame 44 is moved in an x-y plane extending horizontally though the frame 44, each of the components of the inlet 32, outlet 34 and control valves 36, 38 have fixed movement with the frame 44. The flow control unit frame 44 is supported by the transport skid 40, which in turn is adapted to be ground supported. A pedestal frame 46 provides rigid vertical and horizontal supports secured to the flow control unit frame 44, elevating the components (32, 34, 36, 38) of the flow control unit 30 above the frame 44. The inlet 32, and control valves 36, 38 may be secured by bolting or other fasteners to the horizontal supports of the pedestal frame 46, with the flange connections between the components 32, 34, 36 and 38 being axially aligned along an x-axis of the fracturing manifold module. The outlet 34 may be additionally retained, for example with a clamp connection to secure the outlet 34 to the pedestal frame 46. The inlet 32 is shown as a 4-way cross, the outlet 34 is shown as a simple flange connection from the control valve 38. However, in other embodiments, the outlet 34 may be configured differently, for example as a cross with two or more outlets for connection to the fluid connection system 35. The control valves are shown as a remotely operated gate valve 36 and a manually operated gate valve 38. The components of the flow control unit 30 and their connections are industry standard and may be varied according to industry known standards. As noted above, in some embodiments, the flow control unit components may be axially aligned along a z-axis, so as extend in a vertical stack on the frame 44. In such embodiments, the inlet is commonly positioned at the bottom of the stack while the outlet is located at the top of the stack.

As best seen in FIG. 5, an inset of x, y and z coordinates of the fracturing manifold modules 22a, 22b is included, with the y-axis being set to be parallel to the center y-axis of the shared manifold trunk line 24. With reference to these cartesian co-ordinates, the flow control unit frame 44 is shown to include a plurality of parallel spaced frame members 54 such as I-beams, extending in the direction of the y-axis of the module 22, and a pair of parallel spaced side frame members 56 such as I-beams, extending in the direction of the x-axis of the module 22, which combined form the rigid rectangular frame 44. A top plate 58 is connected along the top edges of the frame members 54, 56, and the pedestal frame 46 is rigidly connected, for example by welding and/or bolting, to the top plate 58 and frame members 54, 56.

The transport skid 40 includes a pair of parallel spaced skid frame members 60 such as I-beams (also known as runners), extending in the direction of the x-axis of the module 22, and parallel spaced cross members (not visible), such as I-beams extending transversely (i.e., in the direction of the y-axis of the module) between the skid frame members 60 to provide the generally rigid rectangular transport skid 40. Parallel spaced support plates 64 extend transversely between the upper edge portions of the skid frame members 60 above the transverse cross members. Transport skid roll ends 66 extend through the skid frame members 60 at the front and rear corners of the transport skid 40 (front being at the inlet end) and extend outwardly from the skid frame members 60. These roll ends 66 provide for attachment to a crane for transport and landing, and/or for dragging the module 22 into a desired position. Additional structural frame members for the transport skid 40 and/or the flow control unit frame 44 may be included as appropriate to provide rigid frames to support the weight of the flow control unit 30, to withstand the relative movement between the frames, and to withstand vibration that may occur from the high pressure fracturing fluid.

Also shown are a plurality (such as three or four) height adjustable legs 42 connected at the four corners of the transport skid 40, connected to the skid frame members 60. The legs 42 may be manual jacks, but due to the weight of the module, the legs 42 are more preferably independently controlled, actuated cylinders, such as hydraulic cylinders. Each leg 42 is preferably provided with a leg locking mechanism 68, such as a threaded ring lock, which can be threaded onto mating threads of the leg 42 once each leg 42 is height adjusted in order to lock the leg in position. The side members 56 of the flow control unit frame 44 and the skid frame members 60 of the transport skid may be releasably locked together to prevent relative movement during transport and landing of the fracturing manifold module 22. A ladder 71 and worker safety platform 70 and the like may be provided to operate and service the control valves 36, 38.

During pre-assembly of the fracturing manifold module 22, the flow control unit frame 44 is supported on the transport skid 40, with the lower edges of the parallel spaced frame members 54 supported on the support plates 64 of the transport skid 40. To reduce friction between the frame members, a friction reducing member (not visible) is provided at the one or more points of contact between the frame members 54, 64. The friction reducing member may comprise a sheet of a low friction material extending between the lower edges of the parallel spaced frame members 54 of the flow control unit frame 44 and the support plates of the transport skid 40. Alternatively, this low friction material may be provided as shorter strips at these points of contact. Exemplary low friction materials include plastic and thermoplastic materials such as acetal, polycarbonate, PEEK, PTFE, UHMW, Nylon 6 Cast, Nylon 6/6 PVC and polypropylene. The friction reducing member may alternatively be provided as a lubricant, or as a coating of a low friction material onto one or more of the frame members at the points of contact.

In some embodiments, to provide the above-described relative rotational movement, and preferably also translational movement, between the transport skid 40 and the components of the flow control unit 30, to align the inlet 32 for connection to the shared manifold trunk line 24, the flow control unit frame 44 and the transport skid 40 are connected together by a plurality of independently controlled, actuated cylinders, such as pneumatic or hydraulic cylinders. In other embodiments, the plurality of cylinders might be replaced by manual actuators such as crank systems. In FIGS. 1 and 5, this relative movement is provided by three, independently controlled, hydraulic cylinders (collectively the skid frame cylinders), with one cylinder 72 extending in the direction of the x-axis of the manifold module 22, and two parallel spaced cylinders (not visible) extending in the direction of the y-axis of the manifold module. The x-axis directional cylinder 72 has its ends pivotally connected to an upwardly extending mounting bracket 72b connected to the front end of the transport skid 40, and to a mounting bracket 72d connected to the front most frame member 54 of the flow control unit frame 44. The x-axis directional cylinder 72 preferably extends parallel to a center axis of the manifold module 22, and generally horizontally in the x-y plane. The two y-axis directional cylinders, while not visible in the Figures, each has its ends pivotally connected between the flow control unit frame 44 and the transport skid 40. The y-axis directional cylinders are provided in spaces between the support plates 64 of the transport skid 40 so as not to interfere with the relative rotational and/or translational movement. The support plates 64 are sized to provide a supporting platform for the frame members 54 of the flow control unit frame 44 throughout the full range of the rotational and translational movement. The y-axis directional cylinders are preferably mounted to remain horizontal in the x-y plane. In other embodiments, the y-axis directional cylinders may be replaced with a single cylinder, and the x-axis directional cylinder may be replaced with a pair of parallel spaced cylinders. In other embodiments, additional cylinders might be provided, however, the provision of the three cylinders provides a simplicity of operation and hydraulic controls. The provision of the plurality of hydraulic skid cylinders as described above, pivotally connected between the transport skid 40 and the flow control unit frame 44, allows for translational movement in the direction of either the x-axis or the y-axis of the flow control unit 30, and thus the inlet 32, by moving only the x-axis directional cylinder 72 or the y-axis directional cylinders respectively. However, movement of both the x-axis directional cylinder and one or both of the y-axis directional cylinders provide the relative rotation in the x-y plane about the z-axis, to provide for adjustable connection to the shared manifold trunk line 24 at the inlet 32.

A hydraulic control system is included for operation of the adjustable legs 42 and the skid cylinders. The hydraulic control system includes appropriate control valves to extend and retract the hydraulic cylinders. The control system provides hydraulic locking of the cylinders against further relative movement after aligning the inlet 32 for connection to the shared manifold trunk line 24. The hydraulic locking mechanism for the cylinders includes check valves in the hydraulic lines beyond the hydraulic control valves, to lock the cylinders in place. Similar controls and locking are provided for each of the adjustable legs 42 to lock the legs 42 after leveling.

In the event of settling of the transport skid 40, or if other minor adjustments are needed, one or more of the locking systems for the adjustable legs 42 and skid cylinders can be unlocked (with unlocking of the leg locking mechanism 68), to allow for further adjustments to the position of the inlet 32 or outlet 34 with leg cylinders 42 and one or both of the skid cylinders, and then the adjustable legs 42, leg locking mechanism 68, and hydraulic skid cylinders are re-locked.

c) Fluid Connection System of Fracturing Manifold to Fracturing Tree

As mentioned above, the fluid connection system 35 provides a fluid connection between each one of the fracturing modules 22a, 22b, and one of the fracturing trees 12 of the surface wells $W_1$ and $W_2$. Each of the fracturing trees 12 generally includes similar industry standard components. In some embodiments, the fracturing tree components are as best shown and described herein with reference to FIGS. 1 and 5, but it will be understood that, in accordance with industry standards and practices, other components may be included or substituted, or some components may be deleted. The fracturing tree 12 is shown to be fluidly connected above a wellhead 14. The particular wellhead components shown in FIG. 1 include a tubing head 80 with two wing valves 82. The fracturing tree 12 is shown to include a swab valve 84, above a pump block 85, inlet valves 86 and upper and lower master valves 88, 90 (one manually controlled and one remotely actuated). Fracturing fluid from the fracturing manifold module 22 enters the pump block 85 via the fluid connection system 35 through the inlet valves 86. In some embodiments, such as shown in FIG. 5, the inlet valves are excluded and the fracturing fluid from the fluid connection system 35 enters the pump block 85 directly. While illustrated without the inlet valves in FIG. 5, it will be understood that the inlet valve components 86 are included in most embodiments. The pump block 85 is sometimes referred to in the industry as the frac head or the goat head. In the Figures, pump block 85 is shown as a six-way cross with four diametrically opposed side inlets 92, but other industry standard pump blocks may be used with more or fewer evenly spaced inlets such that fluid entering from each of the side inlets 92 impinges on the fluid flow from another of the side inlets for balanced impingement. When the side inlets are in pairs and diametrically opposed, the fluid impinges in a manner for direct, balanced impingement.

Figure 3:
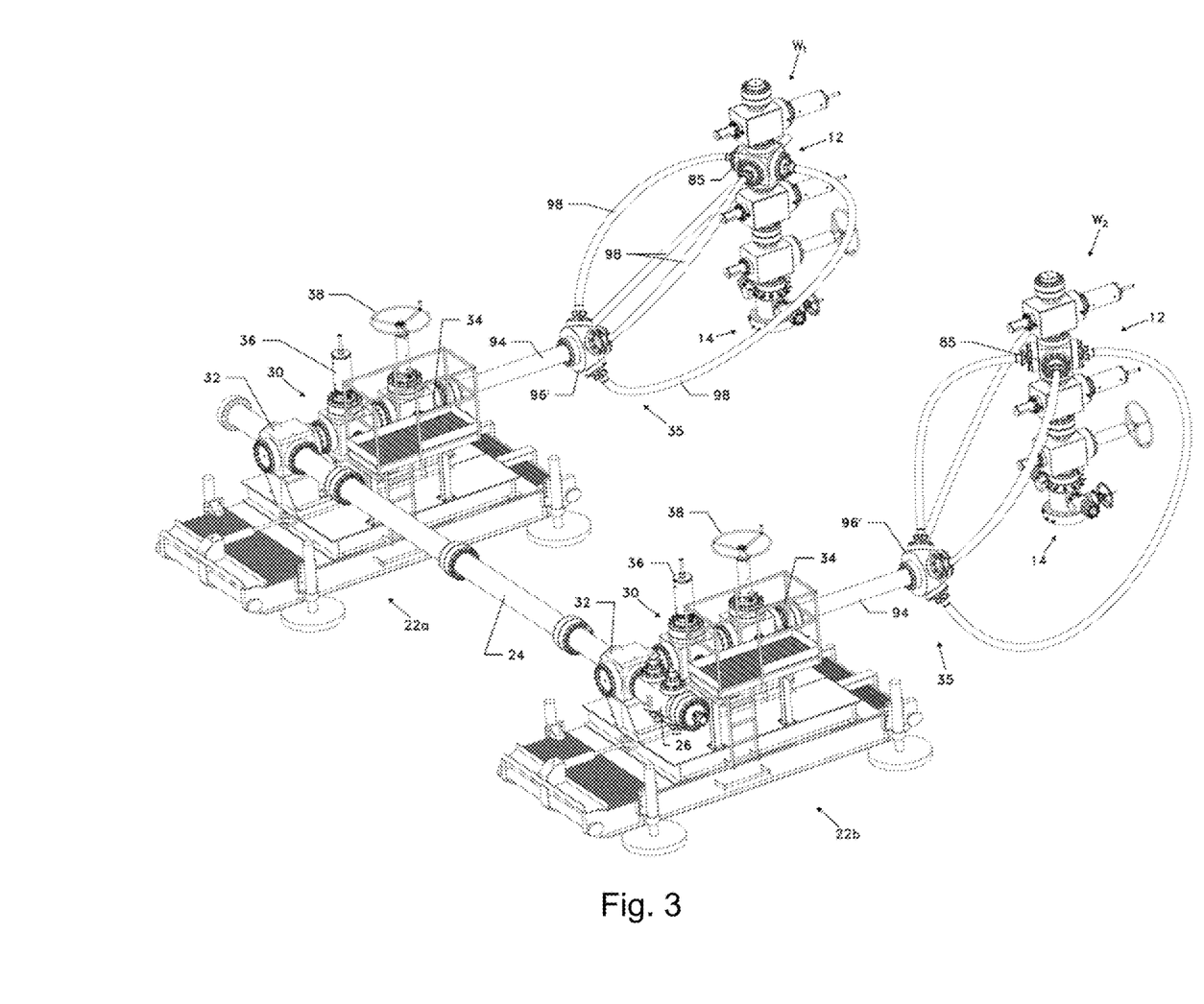
FIG. 3 is a perspective view illustrating a fracturing system in accordance with another embodiment of the present disclosure, with the fracturing manifold modules and shared fracturing manifold trunk line as shown in FIG. 1, but showing the fluid connection system of each of the fracturing manifold modules connecting through four flexible flowlines at the manifold outlet to a fracturing tree of a well.

In the Figures, the fluid connection system 35 for each of the wells W is shown to include similar components, although in some embodiments the components may be varied. The fluid connection system 35 of FIG. 1 includes a manifold flowline 94, which is an optional component, a distribution block 96 with a single inlet 96a and two outlets 96b, and a pair of flexible flowlines 98. In FIG. 3, the fluid connection system 35 includes the manifold flowline 94 (optional), a distribution block 96' with a single inlet 96a and four outlets 96b, and four (two pairs) of flexible flowlines 98. The manifold flowline 94 may be formed from flexible or rigid pipe. In the embodiments of the Figures, the manifold flowline 94 is shown to be a rigid flowline, so is described below as rigid flowline 94. Depending on the spacing from the manifold module 22 to the fracturing tree 12, the rigid flowline 94 may comprise one or more spools of steel pipe such as commonly used in frac iron. The rigid flow line 94 is fluidly connected at a first end 94*a* to the manifold outlet 34 of one of the fracturing manifold modules 22*a*, 22*b*. In FIG. 1, the manifold outlet 34 is shown as the outlet from the control valve 38, but as mentioned above, other industry standard manifold outlets, such as a cross, may be used in other embodiments. The fluid connection at the manifold outlet 34 is shown as a bolted flanged connection, but other industry standard connections may be used.

Figure 2:
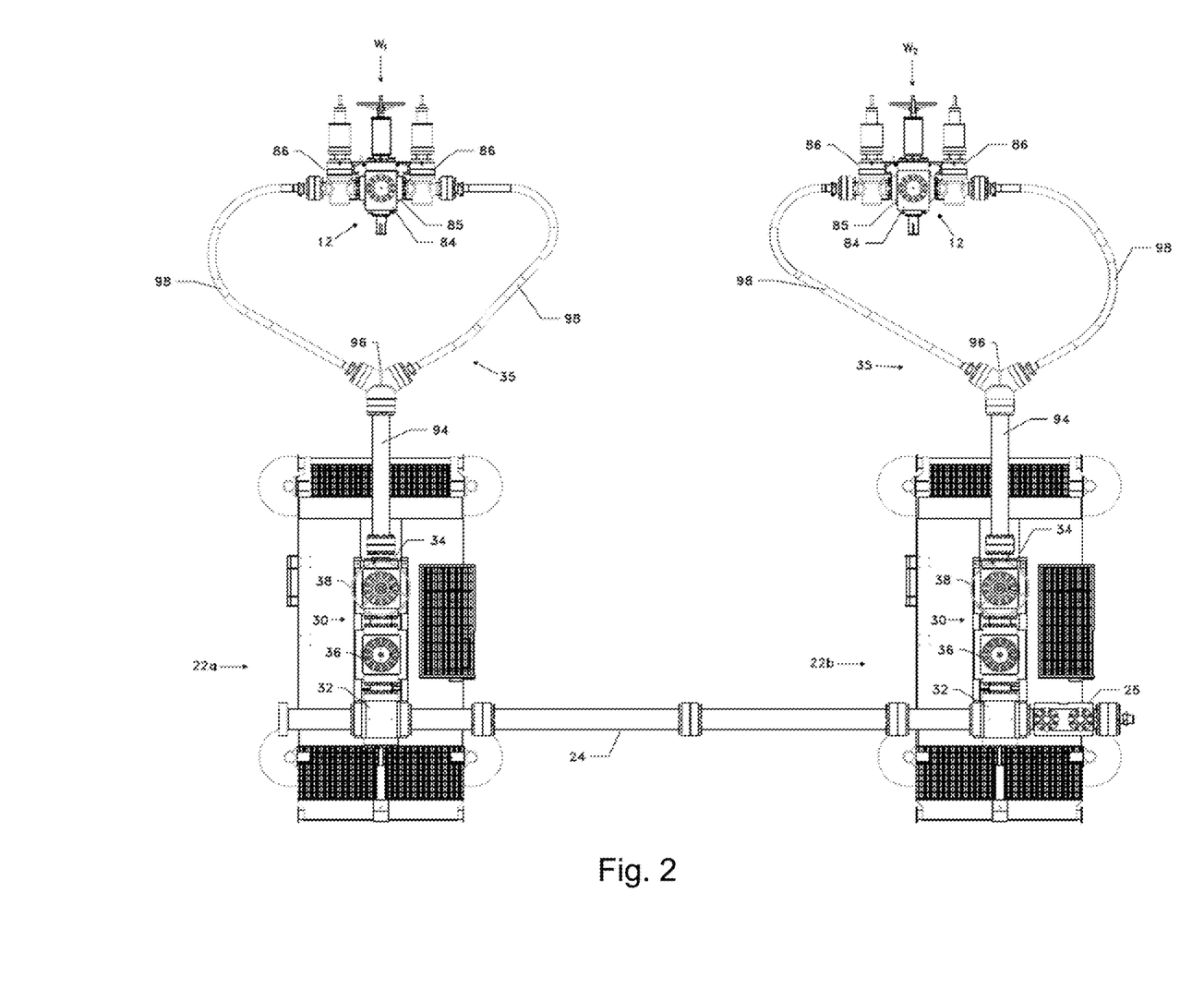
FIG. 2 is a top view of the fracturing system of FIG. 1.
Figure 4:
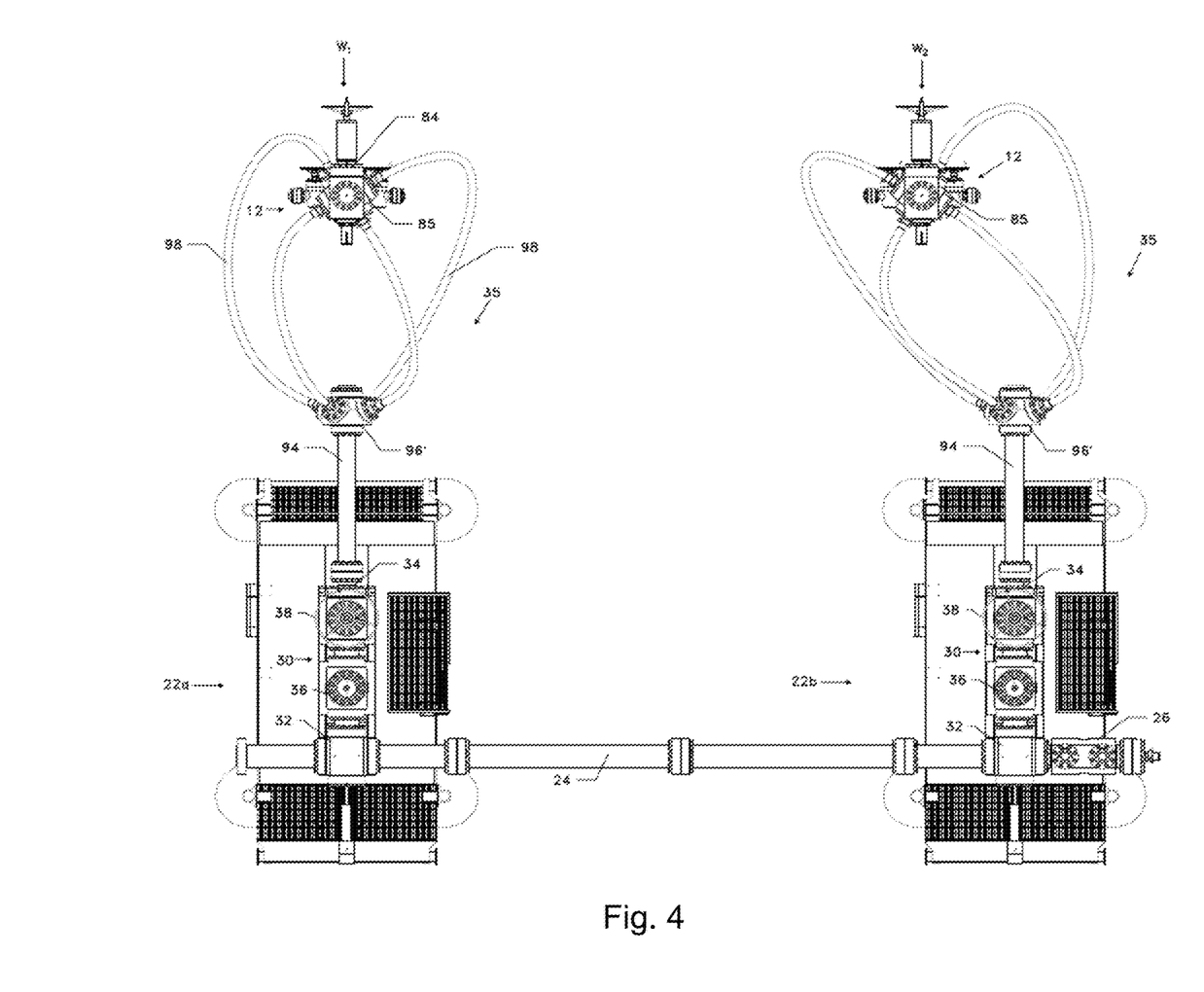
FIG. 4 is a top view of the fracturing system of FIG. 3.

The second end 94*b* of the rigid flowline 94 is connected to the single inlet 96*a* of the distribution block 96 (or 96' in FIGS. 3-5). While this fluid connection in the Figures is shown as a flanged connection, other industry standard connections may be used. The distribution block 96, 96' functions to distribute the fluid flow from the fracturing manifold module 22 into the plurality of flexible flowlines 98 (two are shown in FIGS. 1 and 2 and four are shown in FIGS. 3-5) without abrupt or right angle changes in direction. In FIG. 1, the distribution block 96 provides a branch connection, shown as a Y-connector, with two outlets 96*b* such that the distribution block 96 distributes the fluid flow from the inlet 96*a* along a smooth angle (i.e., the enclosed angle between the intersecting flow axes is greater than 90°), generally evenly to each of the two outlets 96*b*. In FIG. 3, the distribution block 96' provides a branch connection which distributes the fluid flow from the inlet 96*a* along a smooth angle (greater than 90°), generally evenly to each of four outlets 96*b*. The number of outlets 96*b* is generally matched to the number of flexible flowlines 98. In some embodiments, the number of outlets 96*b* and flexible flowlines 98 is a multiple of two, to provide direct, balanced impingement in the pump block 85, as mentioned above. However, in other embodiments, the number of outlets 96*b* and flexible flowlines 98 may be an odd number to provide balanced impingement in the pump block 85.

Each of the flexible flowlines 98 has a first end 98*a* and a second end 98*b* and provides a flexible conduit 100 between the first end 98*a* and the second end 98*b*. The first end 98*a* of each flexible flowline 98 is fluidly connected to one of the outlets 96*b* of the flow distribution block 96 (or 96'). The second end 98*b* is fluidly connected to the fracturing tree 12.

Abrupt or right angle changes in direction are avoided between the manifold outlet 34 and the fracturing tree 12, and preferably also at the manifold outlet 34 and at the fracturing tree 12. This is accomplished by avoiding abrupt or right angle changes in direction through the fluid connections at the manifold outlet 34, at the distribution block 96, and at the ends 98*a*, 98*b* of the flexible flowlines 98. This is also accomplished by using sufficient lengths of the flexible flowlines 98 to provide smooth bending curvature at each bend of the flexible flowlines 98 between the manifold outlet 34 and the fracturing tree 12, and in the provision of the distribution block 96 with distributes the fluid without abrupt or right angle changes in direction. The length of the flexible flowline 98 can be varied by using multiple lengths of flexible conduit 100, interconnected at their ends, for example with threaded connections.

Flexible flowlines are known in the industry, such as are used in subsea and surface wells to replace hard piping. For example, the flexible flowlines 98 may be formed from high pressure thermoplastic polymer pipe (ex. from such polymers as polyetheretherketone (PEEK) or polyaryletherketone (PAEK)), from high pressure flexible composite thermoplastic and metal pipes, from carbon fiber reinforced polymers (CFRP) pipes, or from helically wound or corrugated metal pipe. In some embodiments, the flexible flowlines 98 are combinations of a thermoplastic inner tube within a flexible outer sheath composed of one or more layers of flexible metal and/or thermoplastic materials. One example of a high pressure flexible composite flexible flowline is Coflexip™ flexible pipe, available from Halliburton in different ID for pressure applications of 15,000 psi. In some embodiments, the flexible flowlines 98 are CFRP pipes formed from carbon fiber reinforced materials, in which carbon fiber is embedded in a resinous matrix and reinforced with graphite in combination with PEEK materials. In such embodiments, to maintain internal dimensions, pressure ratings, flexibility and smooth bending curvature, the wall materials can be non-uniform in thickness, material type and/or reinforcement to allow flexibility in one plane and stiffness in the opposite plane. The radius of curvature at bending can thus vary depending on the materials and construction for the CFRP pipe. The CFRP pipe manufacturing techniques, to retain full internal dimensions, pressure ratings, flexibility and smooth bending curvature while retaining torsional stiffness and light weight, can include varying wall thicknesses, layer(s) of carbon fiber reinforcement, layer(s) of PEEK, and opposing thickness at different points along the flexible flowline, to ensure flexibility.

The flexible flowlines 98 are provided with end-fittings to provide fluid connections at the ends 98*a*, 98*b*. While the end-fittings shown in the Figures are bolted flange connections 102, the connections can vary with the particular flexible flowline 98. In some embodiments, the connections may be hub connections, hammer unions, threaded connections, or other quick connections as are known in the industry.

Flexibility allows the flowlines 98 to be bent at smooth bends, without abrupt or right angle changes in direction, to accommodate the flow of the highly erosive fracturing fluids with less erosion damage. The use of the flexible flowlines 98 also reduces the time needed to make changes in direction to accommodate the distance and height differences between the manifold outlet 34 and the fracturing tree 12, without the use of overhead cranes for the heavy and time-consuming elbow connections as are typically used in frac iron connections.

In the embodiments of FIGS. 1 and 2, the second ends 98*b* of the flexible flowlines 98 are fluidly connected to the fracturing tree 12 through the inlet valves 86, while in the embodiment of FIGS. 3-5, the second ends 98*b* of the flexible flowlines are shown as being connected directly to the pump block 85. As above, inclusion of the inlet valves 86 is preferred for most embodiments. In both embodiments, the fluid connections at the second ends 98*b* to the fracturing tree components (whether to the pump block 85, or to the inlet valves 86) are evenly spaced, one from another, such that the fracturing fluid from each one of the plurality of flexible flowlines 98 entering the fracturing tree impinges in a manner for balanced impingement, on the fluid flow from other of the plurality of flexible flowlines 98 in the pump block 85. In some embodiments, the number of outlets 96*b* and the number of flexible flowlines 98 are provided in multiples of two and the fluid connections at the second ends 98*b* are diametrically opposed, one from another, such that the fracturing fluid from each one of the plurality of flexible flowlines 98 entering the fracturing tree directly impinges on the fluid flow from the opposed flexible flowline for direct, balanced impingement in the pump block 85. For a balanced impingement action, the pump head 85 is adapted with a plurality of evenly spaced inlets 92 around the circumference of the pump head. For embodiments providing direct, balanced impingement action, the pump head 85 is adapted with a plurality of diametrically opposed inlets 92, the plurality of flexible flowlines 98 are arranged in pairs, and the distribution block 96 has a number of outlets 96b to distribute the fluid flow generally evenly amongst the flexible flowlines 98. In FIGS. 1 and 2, the two flexible flowlines 98 are arranged to be diametrically opposed one from the other at the connection to the diametrically opposed inlet valves 86, while in FIGS. 3-5, each of the four flexible flowlines 98 are arranged to be diametrically opposed from one of the other flexible flowlines 98 at the pump block 85. This balanced impingement action, and direct, balanced impingement action, in the pump block 85 reduces erosion in components of fracturing tree 12 and in the wellhead components located therebelow.

The fluid connections at each of the ends 98a, 98b, the length of the flexible flowlines 98 and the bending radius of the flexible flowlines along their length are adapted to avoid abrupt or right angle changes in direction between the distribution block 96 and the fracturing tree 12. Since the distribution block 96 also distributes the fracturing fluid to the flexible flowlines 98 without abrupt or right angle changes in direction, and since the distribution block 96 also receives the fluid in a single inlet 96a through an inline connection from the manifold outlet 34 via the rigid flowline 94, the fluid connection system 35 provides a system of connecting a fracturing manifold and a fracturing tree 12, in a manner which avoids any abrupt or right angle changes in direction in all fluid connections at the manifold outlet 34, at the fracturing tree 12 and therebetween. The fluid connection system 35 thus reduces erosion in components of the fluid fracturing system 35, in the fracturing tree 12 and in the wellhead components such as the tubing head 80 located therebelow.

In some embodiments, the flexible flowlines 98 have a combined cross-sectional area that is greater than the cross sectional area of the rigid flowline 94 in order to reduce flow velocity in the plurality of flexible flowlines 98 and at entry to the fracturing tree 12 relative to the flow velocity in the rigid flowline 94. This has the result of reducing erosion in distribution block 96, in the flexible flowlines 98, in the fracturing tree components and in the wellhead components, compared to using a single flowline between the fracturing manifold module 22 and the fracturing tree 12.

In some embodiments, erosion in the distribution block 96 can be further reduced by using coatings, linings or surface treatments at the high erosion areas. Such coatings, linings or surface treatments are well known, for example, hard nano-composite coatings, tungsten carbide hardfacing, ceramic hardfacing and the like.

In some embodiments, the rigid flowline 94 may be omitted, and the distribution block 96 may be fluidly connected directly to the manifold outlet 34. Using the rigid flowline 94 is usually advantageous in providing an inline fluid connection to the distribution block 96 (i.e., axially aligned), and in distancing the distribution block 96 and its connections from both the fracturing manifold module 22 and the fracturing tree 12. The rigid flowline 94 also allows for shorter lengths of flexible flowlines, which are typically more expensive flowline components.

In some embodiments, the distribution head 96 may be supported above the ground, for example with one or more jacks and clamps, on one or both of the distribution head 96 and the rigid flowline 94.

It should be understood that the terms "fluidly connected", "fluidly connecting" or "fluid connection" as used herein and in the claims are meant to include direct or indirect fluid connections between one or more components, with fluid tight seals sufficient for the pressure ratings of the system. The terms do not imply that two components are directly connected one to the other, but rather, allow for making a sealed, high pressure fluid connection between components with the possible inclusion of one or more other components therebetween, such as valves, crosses, tees etc.

d) Operation

As noted above, the fracturing manifold modules 22a, 22b are shown as being of the type providing for an adjustable connection at the manifold inlet 32 for aligned connection along the axis of the shared manifold trunk line. Using the particular embodiments of manifold modules 22a, 22b as shown in the Figures, and as described hereinabove, in combination with the fluid connection system 35 described above, provides additional flexibility in the order of making the aligned connection at the manifold inlet to the shared manifold trunk line and in making the fluid connection between the manifold outlet 34 and the fracturing tree 12. In general, the fluid connections for the fluid connections system 35 can be made before, during or after making the aligned connection at the manifold inlet 32 to the shared manifold trunk line. In other embodiments, where the fracturing module does not provide for adjustable connection at the manifold inlet 32, the fluid connection system 35 is generally connected after making the aligned connection at the manifold inlet 32. In the description which follows, for ease of description, the aligned connection at the manifold inlet is described first, followed by the fluid connections of the fluid connection system 35.

A plurality of fracturing manifold modules 22 are pre-assembled as appropriate for a particular configuration of a fracturing system 10, the pre-assembly being repeated for each manifold module 22. The flow control unit 30 is pre-assembled prior to connecting to the pedestal frame 46 of the flow control unit frame 44. Depending on the particular fracturing operation and the required fracturing rates, the components of the flow control unit 30, the manifold inlet 32, the manifold outlet 34, the components of the shared manifold trunk line 24, and the connections throughout the fracturing manifold system 20 may be varied as appropriate for a particular fracturing operation and in view of the layout of a particular well pad fracturing operation.

The shared manifold trunk line 24 typically has a uniform bore size, such as a 7¹⁄₁₆" bore, although a different bore size may be specified, such as a 5⅛" bore. This 7¹⁄₁₆" bore is generally consistent through the shared manifold trunk line 24, and through each component (32, 34, 36, 38) of the flow control unit 30.

The manifold outlet 34 provides for connection to the fluid connection system 35. While in some embodiments, the outlet 34 could include a cross or other connection, it is shown here to provide a single, direct, inline connection to the distribution block 96 through the rigid flowline 94. In some embodiments, the outlet 34 with a single fluid conduit connection may match the 7¹⁄₁₆" bore (ID) in the flow control unit 30 or may provide a reduced bore such as 5⅛". Other manifold inlet and outlet configurations and connections may be provided as appropriate.

The shared manifold trunk line 24 typically has a single inlet block or multiple inlet blocks 26 adapted to receive high pressure fracturing fluids through one or more fluid conduits from the high-pressure stimulation services. FIG. 1 shows one inlet block 26 having four fluid conduit connections. These fluid conduits are generally prepared for 3" frac iron (2.75" or other bore size) or 4" frac iron (3.50", 3.75" or other bore size). Alternatively, an inlet block 26 may be provided with a 4-way cross. The inlet block 26 with one fluid conduit may match the 7 1/16" bore of the shared manifold trunk line or a 5 1/8" bore, for example.

The flow control unit 30 is pedestal mounted in the pockets provided by the horizontal pedestal supports. The pockets provide recesses for the control valves 36, 38. The inlet 32 and control valves 36, 38 are bolted and/or welded in place. For retaining the flow control unit 30 to the pedestal frame 46, clamp connections and/or fasteners may be used to secure the components of the manifold module 22. The flow control unit 30 is mounted for fixed movement with the flow control unit frame 44, which in turn is supported on the transport skid 40, with the friction reducing members in place, and the x- and y-axis hydraulic cylinders pivotally connected between the flow control unit frame 44 and the transport skid 40 as described above. This pre-assembled fracturing manifold module 22 is then ready for road transport to the well pad.

In the transport (home) position of the fracturing manifold module 22 shown in FIGS. 1 and 2, the four height adjustable legs 42 (hydraulic cylinders) of the transport skid 40 are fully retracted, such that the skid frame members 60 are on the ground.

The flow control unit frame 44 is adjusted relative to the transport skid 40 with the three hydraulic cylinders (skid cylinders) to place the flow control unit frame 44 in the transport position. Releasable locking devices are installed to mechanically lock the flow control unit frame 44 to the transport skid 40. The releasable locking mechanism of the hydraulic control system locks the hydraulic skid cylinders against relative movement, and also locks adjustable legs 42 against movement. In the transport position, the skid cylinders are generally in the midpoint position for the extension and retraction of the three hydraulic cylinders, i.e., there is equal translational movement in the x direction of the one cylinder, and equal translational movement in the y direction for the other cylinders, in the transport position.

The four skid roll ends 66 are used for lifting the fracturing control module 22 by a high capacity crane, or two of the skid roll ends 66 are used with a winch-tractor or bed-truck for transporting and/or initial landing placement of the fracturing manifold module 22, i.e., in the direction of the x-axis of the fracturing module 22. On location, rough measurements are made for initial placement of the fracturing manifold module(s) 22. There is consideration to the grade for movement in the z direction for each fracturing manifold module 22.

The number of fracturing manifold modules 22 generally corresponds to the number of wells being stimulated through fracturing wells W. While two wells are shown in the Figures, it will be understood that the disclosure extends to two or more wells. The inlet block(s) 26 of the shared manifold trunk line 24 receive the high pressure fracturing fluid through one or more fluid conduits from the stimulation services and distribute to the shared manifold trunk line 24 for all modules 22. Placement of the inlet block(s) 26 can be at either end of the outermost modules, or between any two modules.

The shared manifold trunk line 24 includes spacer spools 28 of frac iron between inlets 32 of the fracturing manifold modules 22. Spacer spools 28 are generally standard length in foot increment lengths from approximately 2 feet to 12 feet, but may be provided in non-standard lengths. Connections of the spacer spools 28 are typically industry standard flanges with pressure-energized metal seal ring gaskets. These connections are also standard for the components of the flow control units 30. Spacer spools 28, flow control unit inlets 32, and inlet blocks 26 may be provided with other industry standard connections, for example clamp-end hub connections with pressure energized metal seals.

Outrigger pads 104 may be provided for the adjustable legs 42 on the transport skid 40, reducing the need for additional specifications to the end user to prepare the grade and surface on location. The allotted footprint on location and proximity to wells determines the placement of the fracturing manifold modules 22, the inlet block 26 and number of spacer spools 28 required between subsequent modules 22. Distances are known from one fracturing manifold module 22 to the next (i.e., adjacent fracturing manifold modules 22) depending on the length of spacer spools 28 on each section of the shared manifold trunk line 24. The location of the first fracturing manifold module 22 is determined with consideration to the corresponding well and the allotted footprint for all modules 22. Due to the adjustability provided in each of the fracturing manifold modules 22, only minor consideration is needed for the x-y plane of the first module 22. The high capacity crane lifts and lands the fracturing module 22 by the four roll ends 66 such that inlet 32 is proximate to the location for connecting along the y-axis of the shared manifold trunk line 24. As above, this initial placement may be set for the outlet connections, but the inlet connections more commonly set the position for the first module 22. Alternatively, if space permits, the module 22 may be landed with a bed truck or winch tractor or other equipment, using two skid roll ends 66 on the transport skid 40 and moving the module 22 in the general x-direction (relative to the y-axis of the shared manifold trunk line 24), with the skid frame members 60 sliding on location for proximate placement.

From the known distances each remaining fracturing manifold module 22 is placed with previous consideration to the y-axis of the shared manifold trunk line 24 (or the outlet position in some cases). The high capacity crane is not further needed for making up the connections at the inlet 32 along the shared manifold trunk line 24 or at the outlet 34.

Once all fracturing manifold modules 22 are located and outrigger pads 104 are placed under each adjustable leg 42 of the first module 22, the adjustable legs 42 are raised in the direction of the z-axis to level the flow control unit 30 (and the flow control unit frame 44 and inlet 32), such that the x-y plane of the inlet 32 of the flow control unit 30 (in general this is parallel to the x-y plane of the flow control unit frame 44) is generally horizontal and parallel to the ground. The hydraulic system locks all adjustable legs 42 during leveling and then the leg locking mechanisms 68 are placed on all four adjustable legs 42.

The releasable locking devices are removed between the transport skid 40 and the flow control unit frame 44. As required, the three hydraulic skid cylinders are operated to adjust the position of the inlet and the outlet in x-y plane of the frame 44 by rotating the flow control unit frame 44 relative to the stationary transport skid 40. This adjusts the position of the inlet 32 and the outlet 34 in the x-y plane about the z-axis (Rz). The hydraulic skid cylinders may also be adjusted in the direction of the x-axis and the y-axis with relative translational movement to align the inlet 32 for connection with the y-axis of the shared manifold trunk line 24, although for the first module 22, this may not be needed, depending on the initial placement. After alignment and connection at the inlet 32, hydraulic controls for the x and y-directional cylinders lock the cylinders against further relative movement between the transport skid 40 and the flow control unit frame 44.

On the second (next adjacent) fracturing manifold module 22, the outrigger pads 104 are placed beneath the adjustable legs 42 and the releasable locking devices are removed between the transport skid 40 and the flow control unit frame 44. The adjustable legs 42 are operated to level the frame 44 relative to the ground and to provide for proximity at the inlet 32 to the y-axis of shared manifold trunk line. The three skid cylinders are operated to establish the x-y plane rotated on the z-axis to have the inlet y-axis coaxial with the shared manifold trunk line 24 (as above). The two hydraulic cylinders in the y-direction may be adjusted to assist making up the spacer spools 28. After spacer spools 28 connections are made-up, the four leg locking mechanisms 68 are placed on the adjustable legs 42, and the hydraulic controls lock the skid cylinders and adjustable legs 42 against further movement. Alternatively, as noted above, this second fracturing manifold module 22 may be aligned for connections at the outlet 34.

This process is repeated for the remaining fracturing manifold modules.

During stimulation, the leg locking mechanisms 68 are inspected. If required, for example due to settling, the hydraulic locks for adjustable legs 42 and the leg locking mechanisms 68 are unlocked, the adjustable legs 42 are operated to level at the inlet 32 and/or at the outlet 34, and the hydraulic controls and the leg locking mechanisms 68 are reset. If needed, the hydraulic skid cylinders may be unlocked for fine adjustments at the inlet 32 and/or the outlet 34. After any adjustment, the hydraulic controls are re-locked and the leg locking mechanism 68 are reset.

The fluid connection system 35 between the manifold outlet 34 of each fracturing manifold module 22 and one of the fracturing trees 12 involves initial distance measurements between the manifold outlet 34 and the fracturing tree 12 in order to set the lengths of the rigid flowline 94 (if using), and the flexible flowlines 98 in order to span the distance, including any variations in the height of the outlet 34 and the connection to the fracturing tree 12. In general, the use of the rigid flowline 94 allows the distribution block 96 to be placed at a distance from both the manifold module 22 and from the fracturing tree 12, and allows for shorter lengths of the more expensive flexible flowline 98 to be used.

The connections of the fluid connection system 35 can be made in any order. The rigid flowline 94 is fluidly connected at its ends 94a, 94b between the manifold outlet 34 and the single inlet 96a of the distribution block 96. As above, the connections may be bolted flange connections, or other industry known connections. Each of the flexible flowlines 98 is bent for smooth arced curvature at one or more locations along its length while avoiding abrupt, or right angle changes in direction, to accommodate the distance and height difference between the distribution block 96 and the fracturing tree 12. In some embodiments, more than one length of flexible flowline can be connected together to provide the desired length and smooth bending radius at each bend. Each of the flexible flowlines 98 is fluidly connected at its ends 98a, 98b between one of the outlets 96b of the distribution block 96 and the fracturing tree 12. The fluid connection at the end 98b can be made directly to the pump block 85 of the fracturing tree 12, or to an inlet valve 86 leading into the pump block 85, if inlet valves 86 are present. The flexible flowlines 98 are connected to the fracturing tree in a manner so that the connections are diametrically opposed one from another, such that fluid flow entering the pump block 85 from each one of the plurality of flexible flowlines 98 (whether or not through the inlet valves 86) directly impinges on the fluid flow from another of the flexible flowlines 98. For this reason, the flowlines 98 are generally provided in pairs, for example, one or two pairs. This direct impingement in the pump block 85 has the effect of reducing erosion in the pump block 85, and in the wellhead components located therebelow.

In some embodiments, the distribution block 96 and/or the rigid flowline 94 may be supported and secured in place with jacks and/or clamps.

As mentioned above, in some embodiments the flexible flowlines 98 are sized such that the combined cross sectional area of the flexible flowlines 98 (i.e., inner bore cross sectional area) is greater than the cross sectional area of the rigid flowline 94 (or of the manifold outlet 34 if the rigid flowline 94 is omitted). This reduces the flow velocity in the plurality of the flexible flowlines and at entry to the fracturing tree relative to the flow velocity in the rigid flowline. This has the effect of reducing erosion in the fluid connection system components, in the fracturing tree components, and in the wellhead components. For example, for a rigid flowline having approximately a 7" ID, the cross sectional area of the rigid flowline is 38.5 in$^2$, while three 5" ID flexible flowlines have a combined cross sectional area of 58.9 in$^2$, reducing the flow velocity in the flexible flowlines and at entry to the fracturing tree relative to the flow velocity in the rigid flowline, with the effect of reducing erosion in the fluid connection system components, in the fracturing tree components, and in the wellhead components. In another example, a rigid flowline or manifold outlet ID of approximately 5" ID has a cross sectional area of 19.6 in$^2$, while two 4" ID flexible flowlines have a combined cross sectional area of 25.1 in$^2$, to reduce flow velocity and erosion as mentioned above.

The fluid connection system 35, as described above, uses fluid connections and components which avoid abrupt or right angle changes in direction at the manifold outlet 34, at the distribution block 96, in the flexible flowlines 98, and at the connections to the fracturing tree 12, with the desired effect of reducing erosion in the components of the fluid connection system 35, in the fracturing tree 12 and in the wellhead components located therebelow.

As used herein and in the claims, the word "comprising" is used in its non-limiting sense to mean that items following the word in the sentence are included and that items not specifically mentioned are not excluded. The use of the indefinite article "a" in the claims before an element means that one of the elements is specified, but does not specifically exclude others of the elements being present, unless the context clearly requires that there be one and only one of the elements.

All references mentioned in this specification are indicative of the level of skill in the art of this invention. All references are herein incorporated by reference in their entirety to the same extent as if each reference was specifically and individually indicated to be incorporated by reference. However, if any inconsistency arises between a cited reference and the present disclosure, the present disclosure takes precedence. Some references provided herein are incorporated by reference herein to provide details concerning the state of the art prior to the filing of this application, other references may be cited to provide additional or alternative device elements, additional or alternative materials, additional or alternative methods of analysis or application of the invention.

The terms and expressions used are, unless otherwise defined herein, used as terms of description and not limitation. There is no intention, in using such terms and expressions, of excluding equivalents of the features illustrated and described, it being recognized that the scope of the invention is defined and limited only by the claims which follow. Although the description herein contains many specifics, these should not be construed as limiting the scope of the invention, but as merely providing illustrations of some of the embodiments of the invention.

One of ordinary skill in the art will appreciate that elements and materials other than those specifically exemplified can be employed in the practice of the invention without resort to undue experimentation. All art-known functional equivalents, of any such elements and materials are intended to be included in this invention. The invention illustratively described herein suitably may be practised in the absence of any element or elements, limitation or limitations which is not specifically disclosed herein.

The invention claimed is:

1. A fluid connection system for fluidly connecting a fracturing manifold to a fracturing tree, wherein the fracturing manifold includes a shared manifold trunk line and a fracturing manifold module having a manifold inlet, a manifold outlet, one or more flow control valves between the manifold inlet and the manifold outlet, and the manifold inlet being adapted for connection to the shared manifold trunk line, the fluid connection system comprising:
   a flow distribution block having a single inlet and a plurality of outlets, and being adapted to distribute fluid flow therein between the single inlet and the plurality of outlets without abrupt or right angle changes in direction, the single inlet being adapted to provide a fluid connection to the manifold outlet; and
   a plurality of flexible flowlines, each one of the plurality of flexible flowlines having a first end and a second end and a flexible conduit between the first end and the second end, the first end of each one of the plurality of flexible flowlines being adapted to fluidly connect to one of the plurality of outlets of the flow distribution block, and the second end of each one of the plurality of flexible flowlines being adapted to fluidly connect to the fracturing tree, such that fluid flow in the plurality of flexible flowlines and in all fluid connections at the fracturing tree and between the manifold outlet and the fracturing tree avoid abrupt or right angle changes in direction.

2. The fluid connection system of claim 1, wherein the plurality of flexible flowlines is fluidly connected to avoid abrupt or right angle changes in direction in all fluid connections at the manifold outlet, at the fracturing tree and therebetween.

3. The fluid connection system of claim 2, wherein the fluid connections of the plurality of flexible flowlines to the fracturing tree are evenly spaced apart such that fluid flow entering the fracturing tree from each one of the plurality of flexible flowlines impinges on the fluid flow from other of the plurality of flexible flowlines for balanced impingement.

4. The fluid connection system of claim 3, further comprising:
   a manifold flowline having a first end and a second end, the first end being adapted to fluidly connect to the manifold outlet and the second end being adapted to fluidly connect to the single inlet of the flow distribution block.

5. The fluid connection system of claim 4, wherein the manifold flowline is a rigid flowline.

6. The fluid connection system of claim 3, wherein:
   the plurality of outlets of the distribution block is an even or odd number;
   the plurality of flowlines is the same even or odd number; and
   the distribution block provides a branch connection to distribute fluid flow generally evenly to each of the plurality of outlets.

7. The fluid connection system of claim 6, wherein:
   the plurality of outlets is a multiple of two;
   the plurality of flexible flowlines is the same multiple of two; and
   fluid flow entering the fracturing tree from each one of the plurality of flexible flowlines directly impinges on the fluid flow from another of the plurality of flexible flowlines for direct, balanced impingement.

8. The fluid connection system of claim 7, wherein the plurality of outlets is two or four.

9. The fluid connection system of claim 3, wherein the plurality of flexible flowlines are adapted to fluidly connect to the fracturing tree such that the balanced, impinging flow from the plurality of flexible flowlines occurs in a pump block of the fracturing tree to reduce erosion in the pump block and in wellhead components below the pump block.

10. The fluid connection system of claim 3, wherein the combined cross sectional area of the plurality of flexible flowlines is greater than the cross sectional area of the manifold outlet to reduce flow velocity in the plurality of flexible flowlines and at entry to the fracturing tree relative to the flow velocity at the manifold outlet.

11. A method of fluidly connecting a fracturing manifold to a fracturing tree, wherein the fracturing manifold includes a shared manifold trunk line and a fracturing manifold module having a manifold inlet, a manifold outlet, one or more flow control valves between the manifold inlet and the manifold outlet, and the manifold inlet being adapted for connection to the shared manifold trunk line, the method comprising:
   fluidly connecting a plurality of flexible flowlines between the manifold outlet and the fracturing tree such that fluid from the manifold outlet is distributed into the plurality of flexible flowlines and into the fracturing tree in a manner to avoid abrupt or right angle changes in direction in fluid flow in the plurality of flexible flowlines and in all fluid connections at the fracturing tree and between the manifold outlet and the fracturing tree.

12. The method of claim 11, wherein the plurality of flexible flowlines is fluidly connected to avoid abrupt or right angle changes in direction in all fluid connections at the manifold outlet, at the fracturing tree and therebetween.

13. The method of claim 12, wherein each one of the plurality of flexible flowlines has a first end, a second end and a flexible conduit between the first end and the second end, and wherein the method further comprises:
   a) providing a flow distribution block having a single inlet and a plurality of outlets, and being adapted to distribute fluid flow therein between the single inlet and the plurality of outlets without abrupt or right angle changes in direction;
   b) fluidly connecting the single inlet of the flow distribution block to the manifold outlet;
   c) fluidly connecting the first end of each one of the plurality of flexible flowlines to one of the plurality of outlets of the flow distribution block; and
   d) fluidly connecting the second end of each one of the plurality of flexible flowlines to the fracturing tree in a manner to avoid abrupt or right angle changes in direction.

14. The method of claim 13, wherein, in step d), the fluid connections of the plurality of flexible flowlines to the fracturing tree are evenly spaced apart such that fluid flow entering the fracturing tree from each one of the plurality of flexible flowlines impinges on the fluid flow from other of the plurality of flexible flowlines for balanced impingement.

15. The method of claim 14, wherein step b) comprises:
providing a manifold flowline having a first end and a second end;
connecting the first end of the manifold flowline to the manifold outlet; and
connecting the second end of the manifold flowline to the single inlet of the flow distribution block.

16. The method of claim 15, wherein the manifold flowline is a rigid flowline.

17. The method of claim 14, wherein steps b), c) and d) are conducted in any order.

18. The method of claim 14, wherein:
the plurality of outlets of the distribution block is an even or odd number;
the plurality of flowlines is the same even or odd number; and
the distribution block provides a branch connection to distribute fluid flow generally evenly to each of the plurality of outlets.

19. The method of claim 18, wherein:
the plurality of outlets is a multiple of two;
the plurality of flexible flowlines is the same multiple of two; and
fluid flow entering the fracturing tree from each one of the plurality of flexible flowlines directly impinges on the fluid flow from another of the plurality of flexible flowlines for direct, balanced impingement.

20. The method of claim 19, wherein the plurality of outlets is two or four.

21. The method of claim 14, wherein the impinging flow from the plurality of flexible flowlines occurs in a pump block of the fracturing tree to reduce erosion in the pump block and in wellhead components below the pump block.

22. The method of claim 13, wherein the fracturing manifold module is of the type providing for an adjustable connection at the manifold inlet for aligned connection along an axis of the shared manifold trunk line, and wherein steps b) to d) may be conducted before, during or after making the aligned connection at the manifold inlet to the shared manifold trunk line.

23. The method of claim 14, wherein the combined cross sectional area of the plurality of flexible flowlines is greater than the cross sectional area of the manifold outlet to reduce flow velocity in the plurality of flexible flowlines and at entry to the fracturing tree relative to the flow velocity at the outlet.

* * * * *